T. S. MILLER.
CONVEYING APPARATUS.
APPLICATION FILED DEC. 28, 1906.
901,021.
Patented Oct. 13, 1908.
3 SHEETS—SHEET 1.
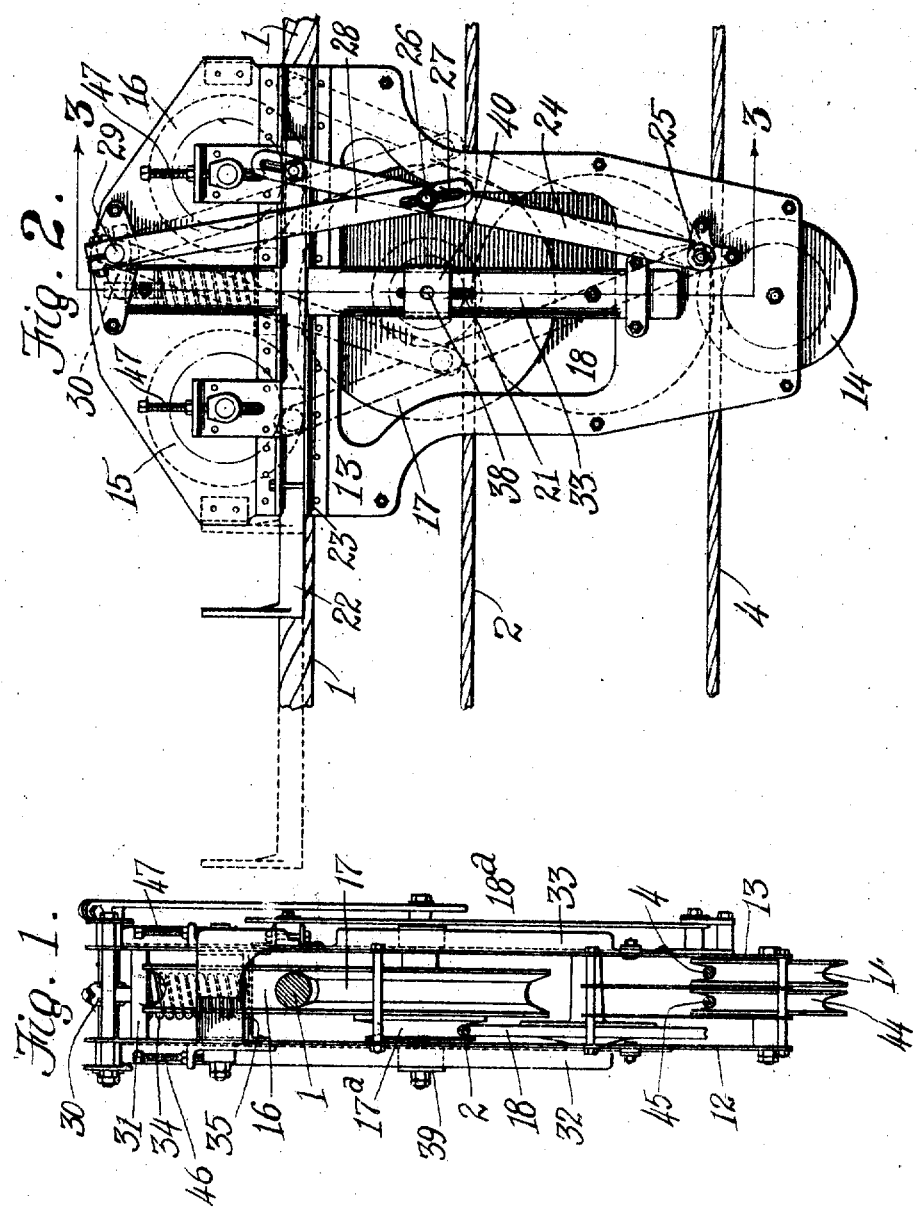

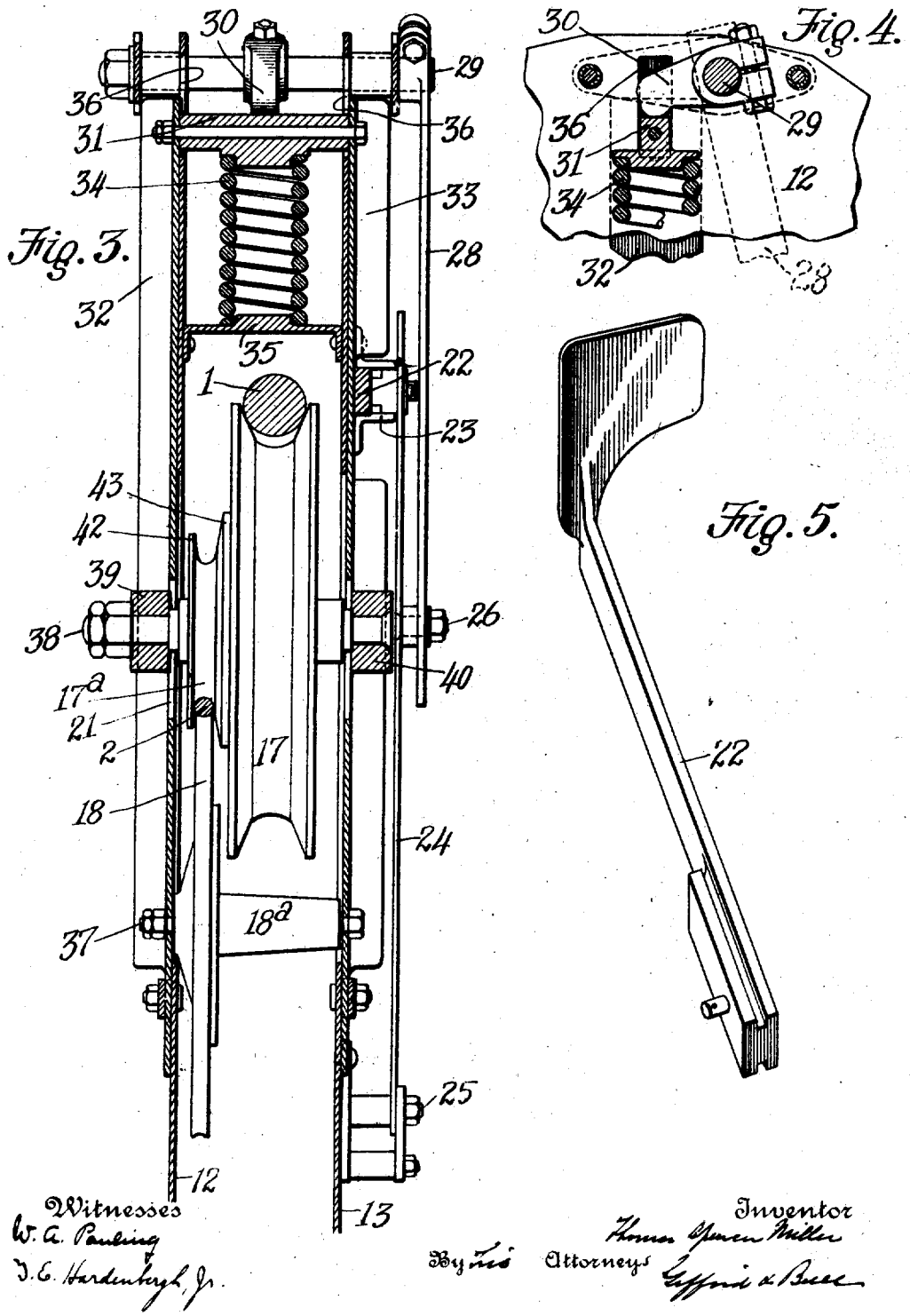

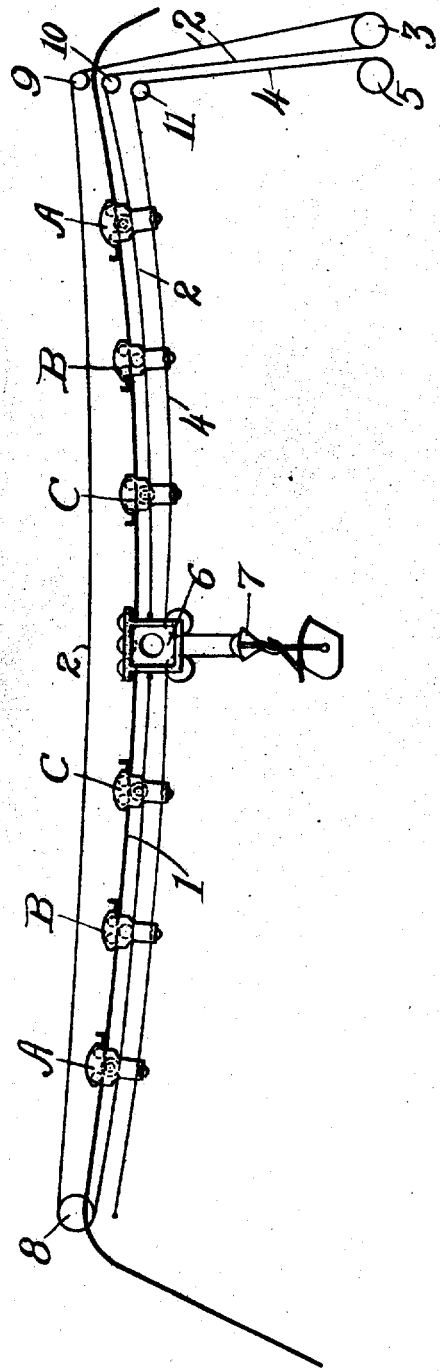

UNITED STATES PATENT OFFICE.

THOMAS SPENCER MILLER, OF SOUTH ORANGE, NEW JERSEY.

CONVEYING APPARATUS.

No. 901,021.   Specification of Letters Patent.   Patented Oct. 13, 1908.

Application filed December 28, 1906. Serial No. 349,775.

*To all whom it may concern:*

Be it known that I, THOMAS SPENCER MILLER, a citizen of the United States, and a resident of South Orange, county of Essex, and State of New Jersey, have invented a new and useful Improvement in Conveying Apparatus, of which the following is a specification.

The primary object of this invention is to improve that class of cableways in which the fall-rope carrier (one or more) contains mechanism for its own propulsion, examples of which class are shown in United States Letters Patent No. 480029 dated August 2, 1892; No. 548973 dated October 29, 1895; No. 561973 dated June 17, 1896; No. 636768 dated June 14, 1899 and in my application Serial No. 312945 filed April 21, 1906. But this invention may also be usefully applied wherever it is desirable to obtain the interdependent travel of a plurality of vehicles running in line upon an elevated cable or trackway.

In the accompanying drawings, I have shown the invention as applied to a series of vehicles only one of which constitutes a load carriage; the others being fall-rope-carriers; but the same principle might be applied without the fall-rope where the carriers carry the traction rope or wherever each of the vehicles is a load-carriage.

In the accompanying drawings, Figure 1 is an edge view of a rope-carrier containing my invention. Fig. 2 is a side view of the same. Figs. 3, 4 and 5 are details. Fig. 6 is a cableway having rope-carriers applied containing my invention.

1 is the supporting cable.

2 is the traction-rope shown as substantially endless and as driven by the rope-drum 3 around which it is wrapped.

4 is the hoisting or fall-rope driven by the rope-drum 5. In the system shown in Fig. 6, the tail of the fall-rope is shown as fast to the tail support or tower of the cableway.

6 is the load-carriage and 7 the fall-block which may be of any suitable form.

8 is the usual tail tower sheave and 9, 10, 11, the usual head tower sheaves.

In Fig. 6, the less than half speed fall-rope-carriers are designated as A; the half speed as B and the more than half speed as C. The carrier shown in Figs. 1 and 2 is approximately three-quarter speed. The carriers may obviously be multiplied to any extent required by the length of span. Each carrier contains the side plates or frame 12, 13, and the fall-rope-supporting sheave 14, the wheels 15, 16 (probably more than one) running on the cable, a traction wheel 17 interposed between the cable 1 and traction rope 2 and a guide wheel 18 beneath the traction rope. The axle 38 of the traction wheel plays in a vertical slot 21. If a half speed carrier is desired, the periphery of the traction wheel bearing on the cable is made of the same diameter as that bearing on the traction rope; if less than half speed is desired, the periphery bearing on the cable is made of less diameter than that bearing on the traction rope; if more than half speed is desired, the periphery bearing on the cable is made of greater diameter than that bearing on the traction-rope, as shown in Figs. 1 and 2. I have shown the two peripheries as parts of the unitary member but this is not essential and as an equivalent construction the two peripheries may be separate and geared together; the relative diameter of the gears determining the speed in lieu of the diameters of the bearing peripheries themselves.

Each fall-rope carrier is provided with a projection 22 movably mounted upon the frame projecting toward the load-carriage and the movement of each of these projections operates mechanism on its carrier whereby the traction pressure against traction wheel 17, 17ª is relieved. The form and location of the projection and of this mechanism may be varied without departing from my invention, but I have shown the form which I prefer at the present time and which I will now describe.

The member 22 consists of a slide extending longitudinally at about the level of the cable and held in a guideway 23 secured to the outside of either side plate 12 or 13. An arm 24 having a slotted connection with slide 22 is pivoted to the frame at 25 and carries a pin 26 operating in a slot 27 in the arm 28 fixed on the end of the shaft 29 having its bearings in the side frames 12 and 13 and carrying midway between them a presser finger 30 acting upon the top of a yoke consisting of a cross piece 31 and the side members consisting of channel bars 32 and 33 arranged to slide vertically on the outside of the frames 12 and 13.

34 is a spring having an abutment 35 on the frame and acting upward upon the yoke member 31 in opposition to the finger 30.

The yoke member 31 has suitable guideways 36 in the side frames 12 and 13 consisting of slots through which it projects. The hub 18ª of the wheel 18 is revolubly mounted on a shaft 37 fixed in the side members 32 and 33 of the yoke. The wheel 17 is revolubly mounted on a shaft 38 passing through bearing blocks 39 and 40 which slide and bear upon the yoke members 32 and 33; slots 21 being cut in said yoke members for the passage of the axle 38. The periphery 17ª of the traction wheel is provided with the flanges 42 and 43 which are of more than ordinary depth, as shown, and of proper width to admit between them the wheel 18 which is flangeless and preferably of a width equal to or slightly less than the diameter of the rope 2. By constructing the periphery 17ª of soft material, such as cast iron, mild steel or bronze, the rope 2 will wear an imprint in such periphery which will produce efficient traction engagement, and as such imprint is deepened by wear the wheel 18 which is of comparatively hard material, will follow up the rope between the flanges 42 and 43 and ultimately into the trench worn by the rope in the periphery of the wheel itself.

44 is a wheel in axial alinement with the wheel 14 adapted to carry a supplemental rope 45, such as a dump-rope, if desired.

46, 47, are set screws adapted to adjust the bearings of the wheels 15 and 16 vertically on the frame.

The pressure productive of traction engagement is produced by the spring 34, which is selected with reference to having its maximum strength such as will not injure the ropes. This spring tends to shove the yoke 31, 32, 33, and the shaft 37 carrying the wheel 18, upward on the frame 12, 13, causing the rope 2 to have traction engagement with the wheel 17, 17ª, and also pressing said traction wheel 17, 17ª upward so as to give it in turn traction engagement with the cable 1. It will thus be seen that the motor spring 34 for the traction engagement exerts its pressure in line with the centers of the wheels 18 and 17, 17ª and that its connections with said wheels are such that its effective pressure is the same no matter in which way the carrier is running.

The mode of operation by which the projection or buffer 22 causes the release of the traction engagement is as follows: When the buffer 22 on one rope-carrier collides either with an adjoining rope-carrier or with the load-carriage, it is forced backward and thrusts backward the arms 24 and 28 so as to depress the finger 30 and thus depress the yoke in antagonism to the spring 34 and lower the wheels 18 and 17, 17ª out of traction engagement. As the rope 2 wears its way into the periphery 17ª of the traction wheel and the wheel 18 follows it up, the normal position of the buffer 22 will be more advanced; advancing, for example, from the rearward full line position, shown in Fig. 2, to the forward dotted position shown therein. The position of the buffer 22 in its slide when the carrier is in operation will, therefore, serve as an indicator for the operator to indicate the extent to which the wheel periphery 17ª is worn and the necessity, if any, of taking up such wear by the adjustment of the set screws 46 and 47. The presser wheel 18 and the coöperating periphery 17ª of the traction wheel being preferably in the same plane they clamp the driving rope 2 without producing any destructive bend therein; the rope running between them in a substantially straight line. The rope 2 being driven by the engine acts as the driver turning the traction wheel, which wheel acts in turn as the driver for the rope carrier. The carrier is thus driven by the driver rope 2 in the same direction as that rope but at less speed and, therefore, follows in the wake of the load-carriage but at less speed; the speed depending upon the relative length of the radii at which the traction wheel contacts, respectively, with the cable 1 and driver rope 2.

The bearings of the presser wheel 18 and traction wheel 17, 17ª are both mounted in slides. That is to say, the bearings of the presser wheel are in the yoke slides 32, 33, and the bearings of the traction wheel 17, 17ª are in the slides 39, 40. And the direction of these slides and of the spring pressure are all in substantially the same line. The presser wheel, the driving rope 2 and the traction wheel are suspended on the spring through the instrumentality of the yoke acting as a hanger.

Having thus described my invention, I claim as new and desire to secure by Letters Patent,

1. In combination, a cable or trackway, a traction rope, a vehicle fixed to said traction-rope, a second vehicle forming a traction engagement with said traction-rope by the following instrumentalities, viz: a flanged wheel and a wheel adapted to follow the traction rope into the groove worn by said rope in said flanged wheel.

2. In combination, a cable or trackway, a traction-rope, a vehicle fixed to said traction-rope, a second vehicle forming a traction engagement with said traction-rope by the following instrumentalities, viz: a flanged wheel and a presser wheel of a gage not substantially wider than the diameter of said rope.

3. In combination, a cable or trackway, a traction-rope, a vehicle fixed to said traction-rope, a second vehicle forming a traction engagement with said traction-rope by the following instrumentalities, viz: two wheels between which the traction rope runs, a yoke spanning the cable and on which one of said wheels is mounted and a spring interposed between an abutment on the frame and said yoke above the cable.

4. In combination, a cable or trackway, a traction-rope, a vehicle fixed to said traction rope, a second vehicle forming a traction engagement with said traction-rope, means actuating said traction engagement and means breaking said traction engagement consisting of the following parts, viz.: the buffer, a lever actuated by said buffer and a vertical slide whereby the traction engagement is controlled.

5. In combination, a cable or trackway, a traction-rope, a vehicle fixed to said traction-rope, a second vehicle forming a traction engagement with said traction-rope, means actuating said traction engagement and means breaking said traction engagement consisting of the following parts, viz: a buffer, an arm and lever actuated by said buffer and a vertical slide whereby the traction engagement is controlled.

6. In a cableway-rope-carrier, in combination, a traction wheel, a presser wheel, means for applying pressure to the presser wheel, means for relieving such pressure, and slides substantially in alinement whereby the bearings of said wheels are carried.

7. In a cableway rope-carrier, in combination, a traction wheel, a presser wheel, slides substantially in alinement whereby the bearings of said wheels are carried, and a spring located in a vertical plane between said slides and acting in substantial alinement with the slides whereby pressure is exerted between said wheels.

8. In a cableway rope-carrier, a traction wheel, a pressure wheel, a yoke in which said wheels are mounted, and a spring tensioning the yoke.

9. In a cableway rope-carrier, in combination, a traction wheel, a presser wheel, a frame, a yoke slidably carried by said frame and adapted to carry the aforesaid wheels, and tension mechanism for the yoke.

10. In a cableway rope-carrier, in combination, a frame, a sliding yoke carried by the frame, a traction wheel, and a presser wheel carried by the yoke, and a spring whereby the pressure is exerted, the action of said spring being substantially in a plane of the axes of said wheels.

11. In a cableway rope-carrier, in combination, a traction wheel, a presser wheel, guideways whereby the bearings of said wheels reciprocate in a plane substantially coincident with the plane of the axes of said wheels, and a tension device for producing the pressure.

12. In a cableway-rope-carrier, in combination, two wheels whereby it is suspended on the cable, a spring between the same, a suspender from said spring and a traction wheel and presser wheel suspended thereby below the cable.

13. In a cableway, in combination, the cable, a moving rope, a traction wheel and a presser wheel beneath the same and a spring whereon said wheels and moving rope are supported.

14. In a cableway-rope-carrier, in combination, a flanged traction wheel, a flangeless presser wheel and a spring producing pressure between the two.

15. In a cableway-rope-carrier, in combination, a flanged traction wheel, a flangeless presser wheel, a spring producing pressure between the two and mechanism whereby said spring is compressed to relieve said pressure.

16. In a cableway-rope-carrier, in combination, a traction wheel, a presser wheel, guideways for the bearings of said wheels approximately at right angles with the cable and a spring tending to press said presser wheel bearings toward the cable and mechanism whereby said spring is depressed to relieve said pressure.

17. In a cableway-rope-carrier, in combination, the frame, the wheel support therefor on the cable, a presser wheel, a traction wheel pressed by said presser wheel toward said wheel support, a presser spring, a buffer whereby said presser spring is compressed and an adjustment of said wheel support to take up wear of said traction wheel.

18. In a cableway-rope-carrier, in combination, the frame, the wheel support therefor on the cable, a traction wheel below the cable, a slide on said frame extending above and below the cable, a presser wheel mounted on said slide below the cable and a presser spring acting on said slide above the cable.

In testimony whereof, I have hereunto signed my name in the presence of two subscribing witnesses.

THOMAS SPENCER MILLER.

Witnesses:
GABRIEL A. PURCHES,
H. G. BARRINGTON.